(12) United States Patent
O'Brien

(10) Patent No.: US 11,636,494 B2
(45) Date of Patent: Apr. 25, 2023

(54) CLASSIC CAR RESTORATION SERVICES SYSTEMS AND METHODS

(71) Applicant: ION Classic LLC, Odessa, FL (US)

(72) Inventor: Michael James O'Brien, Odessa, FL (US)

(*) Notice: Subject to any disclaimer, the term of this patent is extended or adjusted under 35 U.S.C. 154(b) by 175 days.

(21) Appl. No.: 17/123,446

(22) Filed: Dec. 16, 2020

(65) Prior Publication Data

US 2021/0201332 A1 Jul. 1, 2021

Related U.S. Application Data

(60) Provisional application No. 62/955,824, filed on Dec. 31, 2019.

(51) Int. Cl.
| | | |
|---|---|---|
| *G06Q 30/00* | (2012.01) | |
| *G06Q 30/018* | (2023.01) | |
| *G06Q 10/087* | (2023.01) | |
| *G06Q 30/02* | (2023.01) | |
| *G06Q 30/0601* | (2023.01) | |
| *G06Q 20/32* | (2012.01) | |
| *G06K 7/14* | (2006.01) | |
| *G06K 7/10* | (2006.01) | |
| *G06K 19/06* | (2006.01) | |
| *G06K 19/07* | (2006.01) | |
| *G06F 16/955* | (2019.01) | |
| *H04N 5/76* | (2006.01) | |
| *G06Q 10/20* | (2023.01) | |
| *G06Q 50/00* | (2012.01) | |

(52) U.S. Cl.
CPC ..... *G06Q 30/0185* (2013.01); *G06F 16/9554* (2019.01); *G06K 7/10297* (2013.01); *G06K 7/1417* (2013.01); *G06K 19/06037* (2013.01); *G06K 19/0723* (2013.01); *G06Q 10/087* (2013.01); *G06Q 10/20* (2013.01); *G06Q 20/322* (2013.01); *G06Q 20/3276* (2013.01); *G06Q 20/3278* (2013.01); *G06Q 30/0278* (2013.01); *G06Q 30/0641* (2013.01); *H04N 5/76* (2013.01); *G06K 2007/10504* (2013.01); *G06Q 50/01* (2013.01)

(58) Field of Classification Search
CPC .......... G06Q 30/0185; G06Q 30/0641; G06Q 10/20; G06F 16/9554
USPC ......................................................... 705/27
See application file for complete search history.

(56) References Cited

U.S. PATENT DOCUMENTS

| | | | |
|---|---|---|---|
| 2013/0073366 A1* | 3/2013 | Heath | G06Q 30/0261 705/14.25 |
| 2021/0297270 A1* | 9/2021 | Bauer | G07C 9/00309 |
| 2022/0180361 A1* | 6/2022 | Song | G06Q 20/405 |

* cited by examiner

*Primary Examiner* — Ahshik Kim
(74) *Attorney, Agent, or Firm* — Thomas H. Stanton

(57) ABSTRACT

The invention relates to classic car restoration services systems and methods, and, more particularly to classic car restoration services interfacing systems and methods allowing classic car facilities and enthusiasts to document, represent to prospective buyers, acquire classic cars and to facilitate their restorations.

12 Claims, 6 Drawing Sheets

CLASSIC CAR RESTORATION SERVICES SYSTEMS AND METHODS

CROSS-REFERENCE TO RELATED APPLICATION

This application claims priority from U.S. Provisional Patent Application No. 62/955,824, filed Dec. 31, 2019, titled CLASSIC CAR RESTORATION SERVICES SYSTEMS AND METHODS which is hereby incorporated by reference herein for all purposes.

FIELD OF THE INVENTION

The invention relates to classic car restoration services systems and methods, and, more particularly to classic car restoration services interfacing systems and methods allowing classic car facilities and enthusiasts to document, represent to prospective buyers, acquire classic cars and to facilitate their restorations.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office files or records, but otherwise reserves all copyrights whatsoever.

Trademarks used in the disclosure of the invention and the applicants make no claim to any trademarks referenced.

BACKGROUND OF THE INVENTION

As the availability of the variety of cars continues to increase, so does the market demand for access to classic cars. The desire for consumers to acquire cars of specific makes and models only increases with time. The many locations where classic cars exist and where willing buyers of classic cars live create a problem between classic car sellers and willing buyers. Quite often classic cars are abandoned without being purchased by willing consumers.

Previous attempts to create systems and methods to connect classic car sellers with willing buyers, have been unsuccessful due to communication logistics, physical distance, third parties, and time consuming and costly efforts needed to communicate amongst parties.

These previous attempts have necessitated additional personnel, various levels of intermediary sales entities, and additional transactions to connect classic car sellers with potential buyers. Previous attempts to address these problems have not been efficient or successful.

In many instances, classic cars owners require expert restoration professionals to assist in repairing and bringing back the classic car to new or original condition.

Further, these previous methods required engaging with additional third parties in order to coordinate specialty services.

The classic car market continues to rise. In 2017 there were over 10 million auctioned vehicles of all types. This rise in classic car demand requires additional methods be developed for owners, restoration services providers, and buyers to connect and access reliable information with regards to specific cars.

Further, because the classic car industry commands a minimum $25,000 average selling price, the marketplace continues to increase in cumulative commercial value.

Accordingly, there is an established need for classic car restoration services systems which solve at least one of the aforementioned problems. Further, there is an established need for classic car restoration systems and methods, having various forms, that can connect classic car enthusiasts and restoration services providers.

SUMMARY OF THE INVENTION

Embodiments of the present invention is a system which can include mobile applications configured to interface with, but not limited to, smart phones, tablets, laptops, desktops, and/or mobile devices to allow classic car enthusiasts and service providers to interact. In embodiments, automotive enthusiasts can utilize aspects of the present invention to authenticate a classic car, acquire professional restoration services, engage in classic car valuations, and/or provide communication mediums for classic car owners, restoration service providers, and market classic cars to willing buyers.

In an aspect, the system can also include digital communication portals wherein users can authenticate information from entities about a classic car such as, but not limited to, vehicle videos, photographs, insurance records, condition of the automobile, repair and restoration receipts, federal, international, and commercial certification entities, car manufacturers and classic car resellers.

In an aspect, the system is a platform that comprises of a web based server application and a mobile application, configured to offer individual users such as classic car owners, restoration shops and companies, a documentation, authentication and socialization platform which connects fellow enthusiasts, customers, mechanics and advertisers in a secure, predictable and reputable manner.

In an aspect, the system can also include proof of workmanship using digital documentation which can be certified by an authenticating third party.

In an aspect, the system can also include needed insights to restorations for suppliers of parts and services in a timely and detailed manner so that they can market to prospective customers in a time based model.

In another aspect, the system can also include digital real-time interface platforms to allow users of the system to connect and share information on other social media platforms.

In yet another aspect, the system can include historical databases that can allow registered and certified users of the system to research classic car information.

In embodiments, the system can include web cam video portals for users to monitor restoration services occurring in real time.

In another embodiment, the system can also include date time stamped pictures documenting restoration efforts and allow users of the system to research all past restoration efforts. These pictures can also have a geotag associated with the picture so that a user can verify the location of the vehicle when the picture was taken.

In yet another embodiment, the system can include certified and authenticated inventory identifier identification device such as quick response (QR) codes embedded in the system's database.

In an aspect, the system can include covered business methods, the methods configured to monetize efforts of sellers, buyers, and service providers in the classic car reselling market.

In another aspect, the system can include authenticated certified valuations from Original Equipment Manufacturers (OEM).

In an aspect, the system can include mobile applications which can be utilized on a mobile device.

In another aspect, the system can also include laptops, desktop computers, and computing mediums.

In another aspect, the system can include a method to transfer a classic car's digital documentation to a new owner.

Embodiments of the system can provide users mechanisms, which may be performed utilizing an instant invention application, to ensure services are performed and/or supported with a satisfactory level of documentation. These aspects create proof of workmanship for the classic car owner and/or shop.

Without these aspects in place, market value of the vehicles could be negatively impacted.

Without these aspects in place, future prospective owners could review these classic cars with a level of skepticism resulting in purchases below market value.

Utilizing these embodiments, vendors supplying parts and services to the classic car restoration enthusiasts and shops have a secure method to understand the exact stage of a restoration which would allow them to target their marketing against a digital timeline created by the use of the platform and align offers and promotions to the exact stage of a particular restoration.

Classic Car inspection and authentication is a complex process which require physical inspections and subject matter expertise. Utilization of aspects of the system provide a robust managed documentation process and platform which allows use of these services to apply to all tiers of vehicles.

These and other features and advantages will become apparent from the following detailed description of illustrative embodiments thereof, which is to be read in connection with the accompanying drawings.

BRIEF DESCRIPTION OF THE DRAWINGS

The features and advantages of the present invention will be better understood when the Detailed Description of the Preferred Embodiments given below is considered in conjunction with the figures provided.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
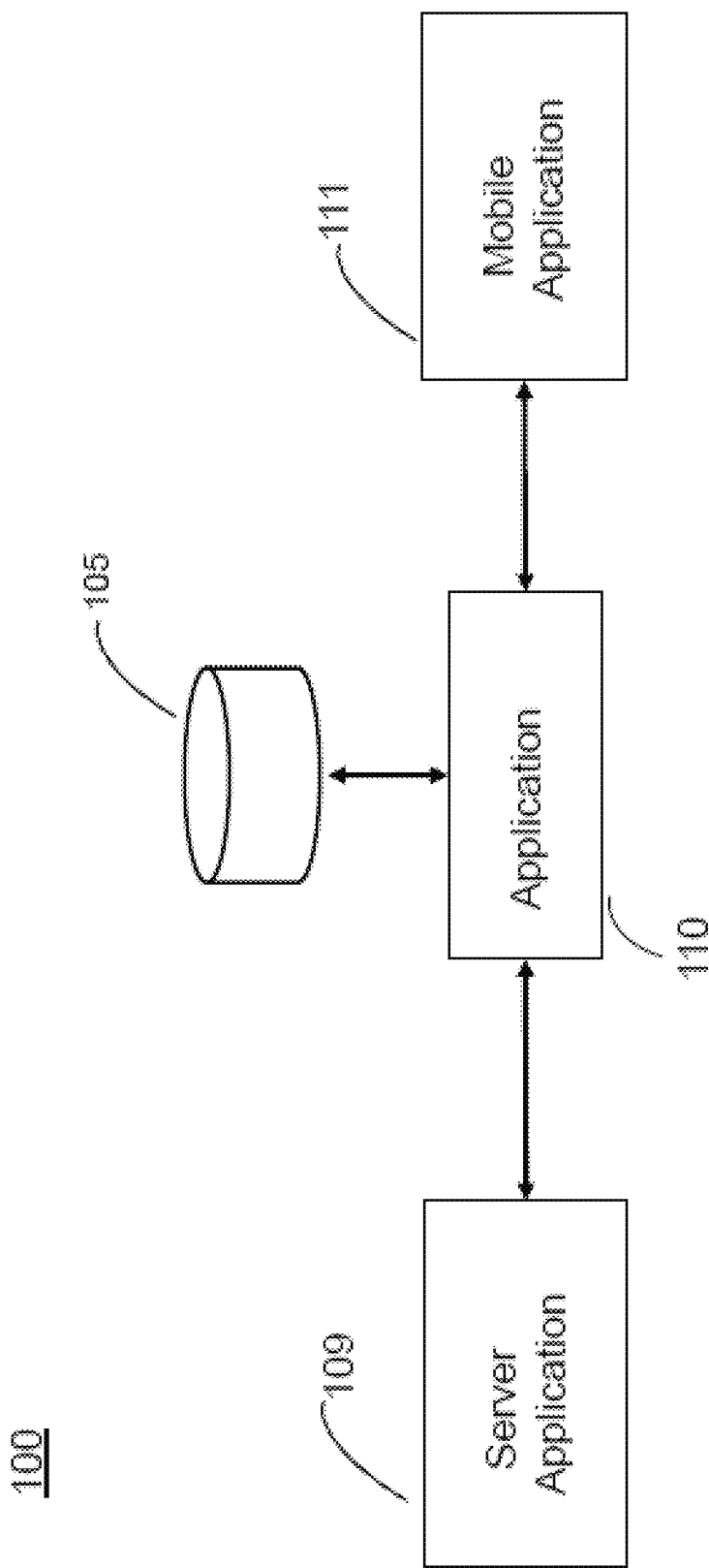
FIG. 1 is a block diagram of the application.

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and numbers may or may not be shown on all figures to provide the reader a clearer and unobstructed view of the invention.

In the following description, numerous specific details are set forth. However, it is understood that embodiments of the invention may be practiced without these specific details. In other instances, well-known structures and techniques have not been shown in detail in order not to obscure the understanding of this description. Those of ordinary skill in the art, with the included descriptions, will be able to implement appropriate functionality without undue experimentation.

References in the specification to "one embodiment" or "an embodiment," may indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that such feature, structure, or characteristic may be deployed in connection with other embodiments whether or not explicitly described.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The term vehicle, car and automobile are used interchangeably to mean an automobile.

The term contributing vendors, suppliers and commercial entities such as mechanics and shops are those vendors that are part of the network provided by the instant invention.

As this invention is susceptible to embodiments of many different forms, it is intended that the present disclosure be considered as an example of the principles of the invention and not intended to limit the invention to the specific embodiments shown and described.

The terms owners, people, client, enthusiasts, user, consumer and individual are used interchangeably to mean an individual who uses the invention.

The terms supplier, parts supplier, repair shop, restoration shop, mechanics and advertisers are used interchangeably to mean companies who use the invention.

The term platform, system, process and method are used interchangeably to mean a process of the invention.

All the input and display fields shown in the detail description of the invention are optional and some embodiments may use all or only some of the input fields.

The prior art does not provide for a system that provides a system for supporting interactive communication between car owners, buyers, appraisal and restoration activities. The prior art includes U.S. patent application 20130332578 entitled Method and System for Storage and Selective Sharing of Vehicle Data the contents of which is incorporated by reference in its entirety.

The system of the instant invention is a platform that includes a web based server application and mobile based client application. The system is configured to offer individual users such as classic car owners, restoration shops and companies, a documentation, authentication and socialization platform which connects fellow owner, enthusiasts, parts suppliers, customers, mechanics, restoration shop, repair shop, and advertisers in a predictable and reputable manner. The instant invention has a registration process that includes inputting registration information that consist of Vehicle Identification Number (VIN), license plate number, owner and mechanic information and vehicle history information.

Classic car value in many cases is dependent on the condition of the automobile and the accuracy of the restoration. The price of the classic car can also depend on how easy it is for a buyer to verify the condition of a vehicle and confirm that the restoration has been completed. The instant invention connects automobile enthusiasts, shops, dealer, sellers, owners and perspective customers with an easy to use real time on demand mobile application which can provide photographs, restoration information such as Vehicle Identification Number (VIN), vehicle photographs, license plate number, owner and mechanic information, history information and digital restoration documentation.

The instant invention is a system that allows for the collection, management and presentation of pictures, documents, awards, restoration plans, to-do lists and general information relative to a classic car which help in the documentation, authentication and tracking of the classic automobile. The instant invention allows the restoration team the ability to create restoration plans and document an automobile restoration by uploading pictures and documents of the restoration in real time from a mobile application. This provides a means for the restoration team comprised of owners, people, client, enthusiasts, user, consumers, suppliers, parts supplier, repair shop, restoration shop, mechanics and advertisers to create an online history that is secure due to the members only use, online security and data backup features of the instant invention. The ability to provide continuous and online documentation of a restoration project increases the automobile's value to potential buyers because the restoration detail is available online to the perspective buyer. Also, classic car authentication entities can engage with potential buyers to certify authenticity of a car based on the data stored in the database and linked to the vehicle by the inventory identifier identification device or QR code which provides the ability to retrieve accurate data stored in the database about the classic car. This makes the process transparent and easy to verify.

The system uses the inventory identifier identification device which is issued by the application on the web based server application to create a unique identifier for the automobile which connects the automobile with the dataset and allows fellow enthusiasts, buyers or others to quickly access the car's documentation photos and information. The inventory identifier identification device feature of the account allows the non-users of the instant invention to view the associated data for a vehicle. The viewing capability does not allow them to download or enter data thereby ensuring security of the vehicle record.

The application of the instant invention provides the user the following features: account creation, company or user profile, automobile profile, automobile condition, photo library, restoration documentation and inventory identifier identification device or QR code. The application comprised of a server application, a mobile application and a database for storing the information. The inventory identifier identification device which is issued by the application on the web based server application creates a unique identifier for the automobile which connects the automobile with the dataset which records the restoration of the automobile.

The instant invention allows all parties to participate by providing a mobile application that utilizes the inventory identifier identification device or QR code to promote information sharing and collection, an online website that provides increased features and allows for detailed management of the vehicles and their data and it provides a commerce platform for auction houses by providing a digital and interactive platform for transparent presentation of available vehicles.

The instant invention platform allows for contributing vendors, suppliers and commercial entities such as mechanics and shops to add pictures and other documentation as they perform work on a client's/owner's vehicle. This allows for documentation to be added in real time as work is performed. The instant invention can also capture receipts and vendor/supplier information and associate the data with vehicle.

The inventory identifier identification device or QR code provides key functionality for both buyers and sellers by providing accurate and detailed information about a vehicle. The inventory identifier identification device or QR code is linked to a specific vehicle file and allows for rapid access of accurate information about the vehicle, allows users to share information and create tracking alerts as to auction status. The inventory identifier identification device or QR code is unique to the specific vehicle and cannot be reused for another vehicle. This creates a secure environment where only data for a specific vehicle is addressable by the inventory identifier identification device or QR code.

Alternatively, the inventory identifier identification device or QR code can be replaced with an electronic inventory identifier identification device such as a Bluetooth tag, Zigbee tag or RFID tag. The electronic inventory identifier identification device would be purchased from the website of the instant invention and when received by the purchaser they register the electronic inventory identifier identification device and associate it with a specific vehicle on the website. This also allows a dealer to prebuy the electronic inventory identifier identification device and pair it with a vehicle when they start a project. The electronic inventory identifier identification device like the QR code is unique to a specific vehicle and can only be paired with one vehicle and therefore the instant invention prevents reuse. The electronic inventory identifier identification device once paired with a project vehicle can then be read by the automobile enthusiasts, shops, dealer, sellers, owners and perspective customers using their mobile devices and the instant invention application. This prevents the issue of using a QR code for an unregistered vehicle which is possible and makes the system more secure because the electronic identification device is serialized by the website of the invention. The inventory identification device is paired with the vehicle and the data is stored in the database and is available to future owners and restoration entities. Ideally the electronic inventory identifier identification device is installed in the vehicle such as inside the engine compartment or glove box so that it is scannable by the instant invention mobile application. When an electronic inventory identifier identification device is used it creates a physical component which is associated with the vehicle and provides a permanent link to the data set.

Another benefit of the system is the benefit of work validation. The instant invention uses geolocation, time stamp for the photos, invoices and receipts. This provides validation that the car did indeed reside at a location and that the shop which uploaded the receipt or invoice to the documentation of a vehicle, completed the work at the time the documentation is uploaded, because the geolocation information can be compared to the shop physical location. Allowing for a validation of the work having been performed at a location and a specific time. The system utilizes the GPS system of the device taking the photographs and associates the GPS information to the photo and files uploaded. The application can use any geotagging software to tag the photographs or documentation/files such as receipts and invoices. One common product for geotagging is Geotag Photos Pro can be used by the instant invention to attach GPS information to the photo and documentation/files uploaded.

Another benefit of the instant invention is that it provides the opportunity for the commercial users to benefit from time based marketing. Time based marketing allows for parts suppliers and other interested parties to gain access to each restoration file and then process the pictures by placing them into categories with a timestamp, geolocation information and referenced to a known process. This allows the interested parties to make assumptions and anticipate the next steps. Knowing this, a marketer can now market on a timeline particular parts and product offerings which will be more meaningful to the end user and yield a better return on marketing investment.

The instant invention search and marketing components also allows users who are looking for a specific part such as a door handle for a Ford Mustang to focus the search parameters of the instant invention such that the search will only search websites related to Ford and Mustang parts.

The instant invention also provides for additional marketing opportunities for commercial users to use email and promotion integration. This feature allows for a set of actions or accomplishment of milestones in the restoration process to trigger an automatic event for the supplier or vendor which can be an email with a note of encouragement and or a promotion for a product or service to a specific vehicle owner or shop working on the vehicle. The advertisements can be generic and targeted. The instant invention also provides for vendors to place ads specific to make model and owner. Therefore they can target their advertisements. Another feature is that the companies can license the platform and use it to market to their users.

The instant invention also allows for videos and how to videos, tips and techniques which can be posted to the system by individual owners or commercial entities The instant invention can also provide direct search capabilities which provides benefits to the commercial and individual users. Direct search capabilities allow the application of the instant invention to have an embedded search which is aligned by the car brand being restored by a user. If the instant invention is being used by a company it can be utilized to manage and reach their users. The company can have the search results directed to their website search engine keeping users within their catalog and digital environment. Thereby efficiently promoting their products. The ability for Integrated search on parts and assemblies is important and can benefit the company supplying the parts and the individuals restoring a vehicle.

Another important feature of the instant invention is the transferability of the data. The dataset is created in support of a classic car and can be transferred from one owner to the next, creating a living digital diary for the vehicle, further enhancing the value and validation of the classic car.

The instant invention also facilitates digital judging and certifications. The ability of the instant invention to collect data allows the instant invention to provide a digital tool which can be integrated into a completive platform and allow different judges to create a virtual competition of various vehicles and to judge the authenticity of and certify a car according to a documented set of automotive standards. In combination with the inventory identifier identification device this allows for rapid validation that the car represented, is indeed one in the same with the instant invention dataset.

The platform can alternatively be restructured to support:
Home construction and restoration.
Marine industry in the documentation of marine vessels.
Other areas of automotive such as motorcycles.
Classic and restored airplanes.
Classic boat restoration.

The instant invention also provides the ability to access the platform on a free trial basis, single project basis, hobbyist where you can have multiple projects or a shop license with unlimited projects. This allows the seller and restoration communities to participate in the platform on multiple levels.

The following description of the instant invention Refers to FIGS. 1-6.

Referring to FIG. 1 the application 110 is comprised of a mobile application 111 and a server application 109 and database 105.

Figure 2:
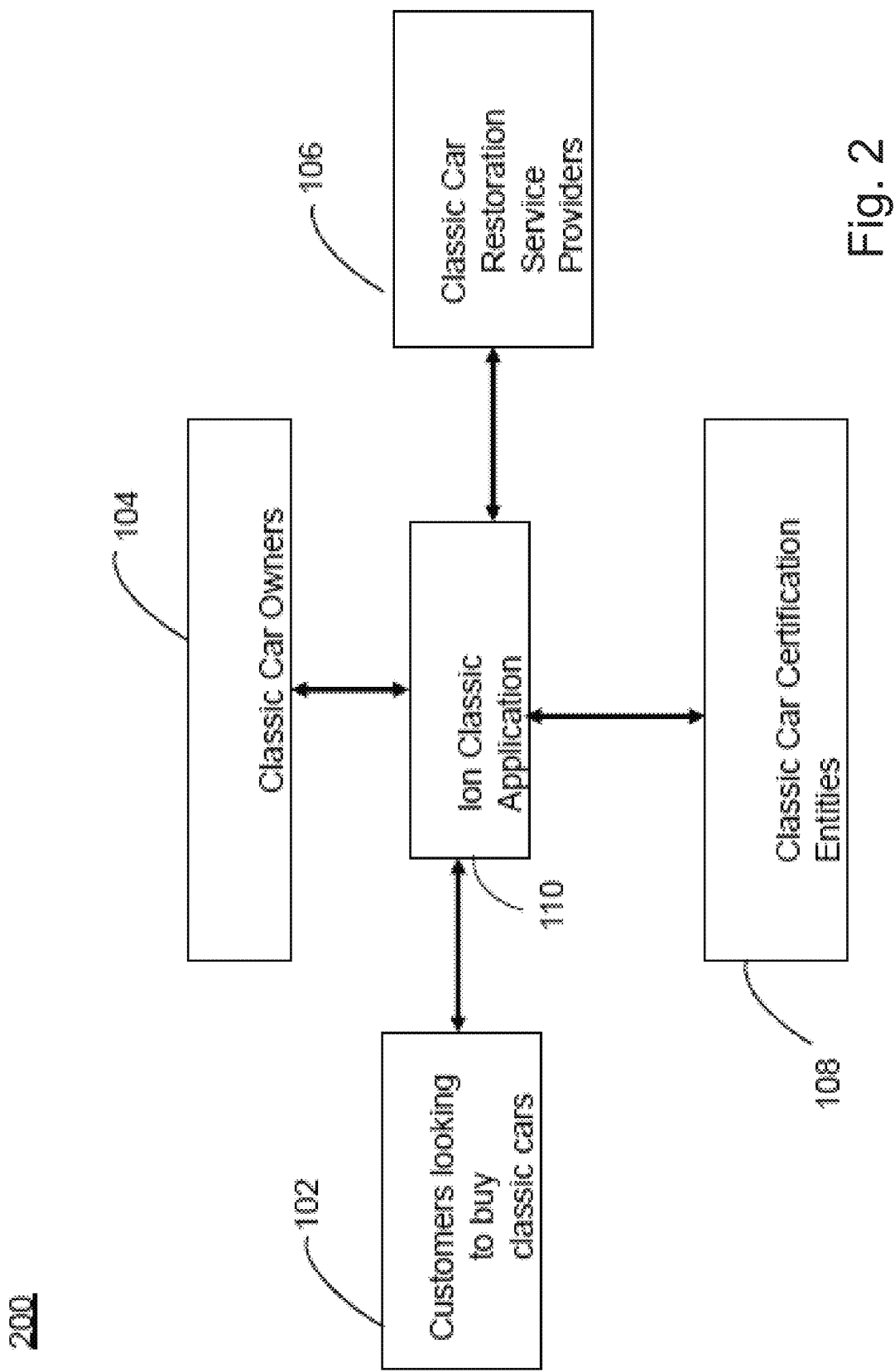
FIG. 2 is a block diagram of an embodiment of a classic car restoration services systems and methods.

Referring to FIG. 2, an embodiment of the present invention is shown displaying a block diagram of the interfaces of classic car restoration services systems and methods. Utilizing the instant invention system 200, customers or sellers looking to buy or sell classic cars can log on to the instant invention system 200 using the instant invention application 110 by accessing it with the server application 109 shown in FIG. 1 or the mobile application 111 shown in FIG. 1 to explore databases of classic cars stored on the database 105 shown in FIG. 1 of the instant invention. Classic car owners 104 can list cars they wish to sell using the instant invention application 110. Further, classic car restoration providers 106 can list their services on the instant invention system 200 using the instant invention application 110 in order to coordinate restoration efforts of new car buyers. Additionally, the instant invention system 200 can include classic car certification entities 108 in order to provide authentication of a classic car. Classic car buyers 102 can utilize the instant invention to explore the available inventory listed in the database 105 shown in FIG. 1 of the instant invention 100.

Figure 3:
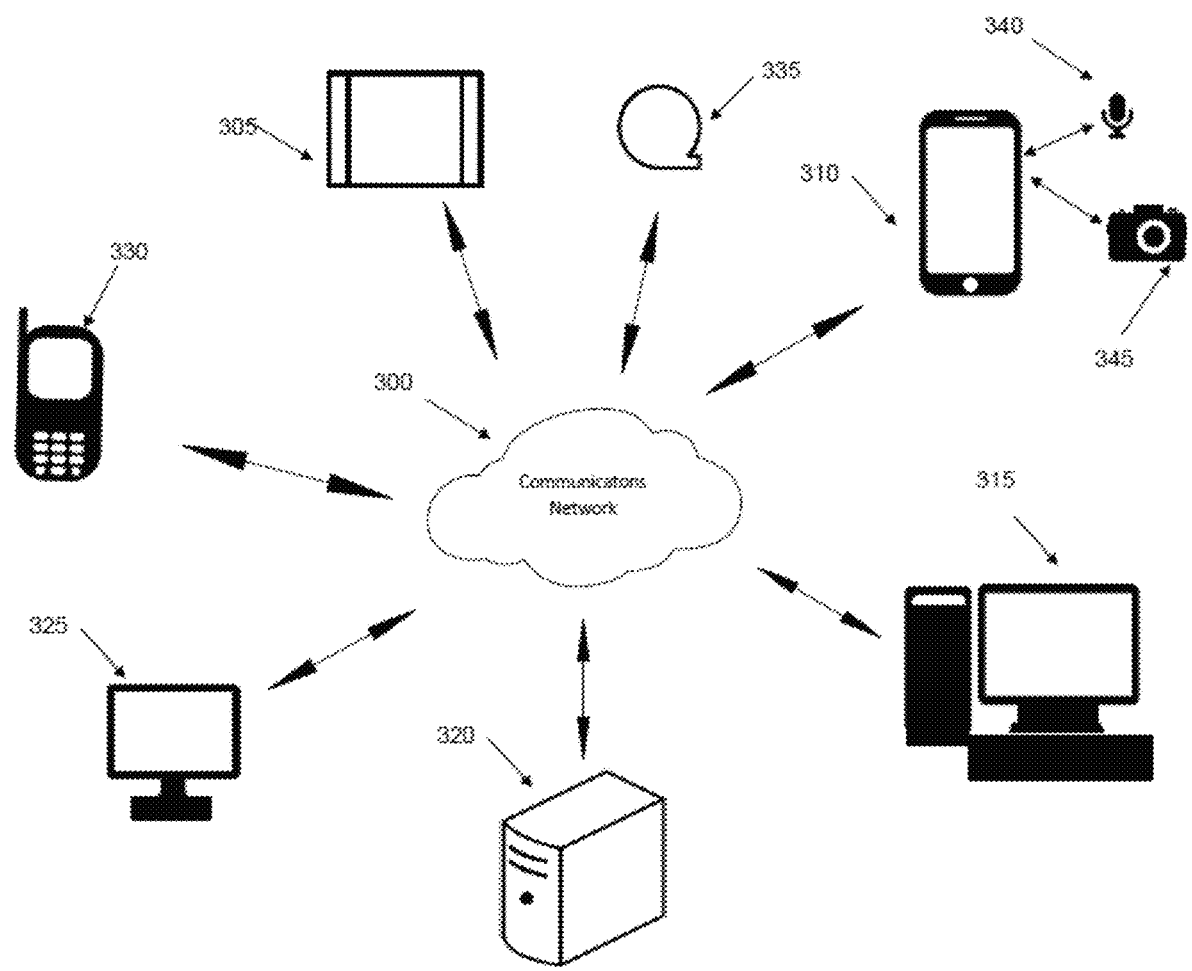
FIG. 3 is a control platform diagram of an embodiment of the present invention.

Turning to FIG. 3, communication methods and devices are shown in an embodiment of the present invention. Embodiments of the present invention can allow users of the system to utilize mobile devices 305, laptops 325, smart mobile devices such as a smart mobile device 310 having camera 345 and microphone 340, desktop computers 315, workstations 320, cell phones 330, and/or data processing devices 335 interacting with the instant invention application and communication network 300 to facilitate classic car sales and/or restoration.

Figure 4:
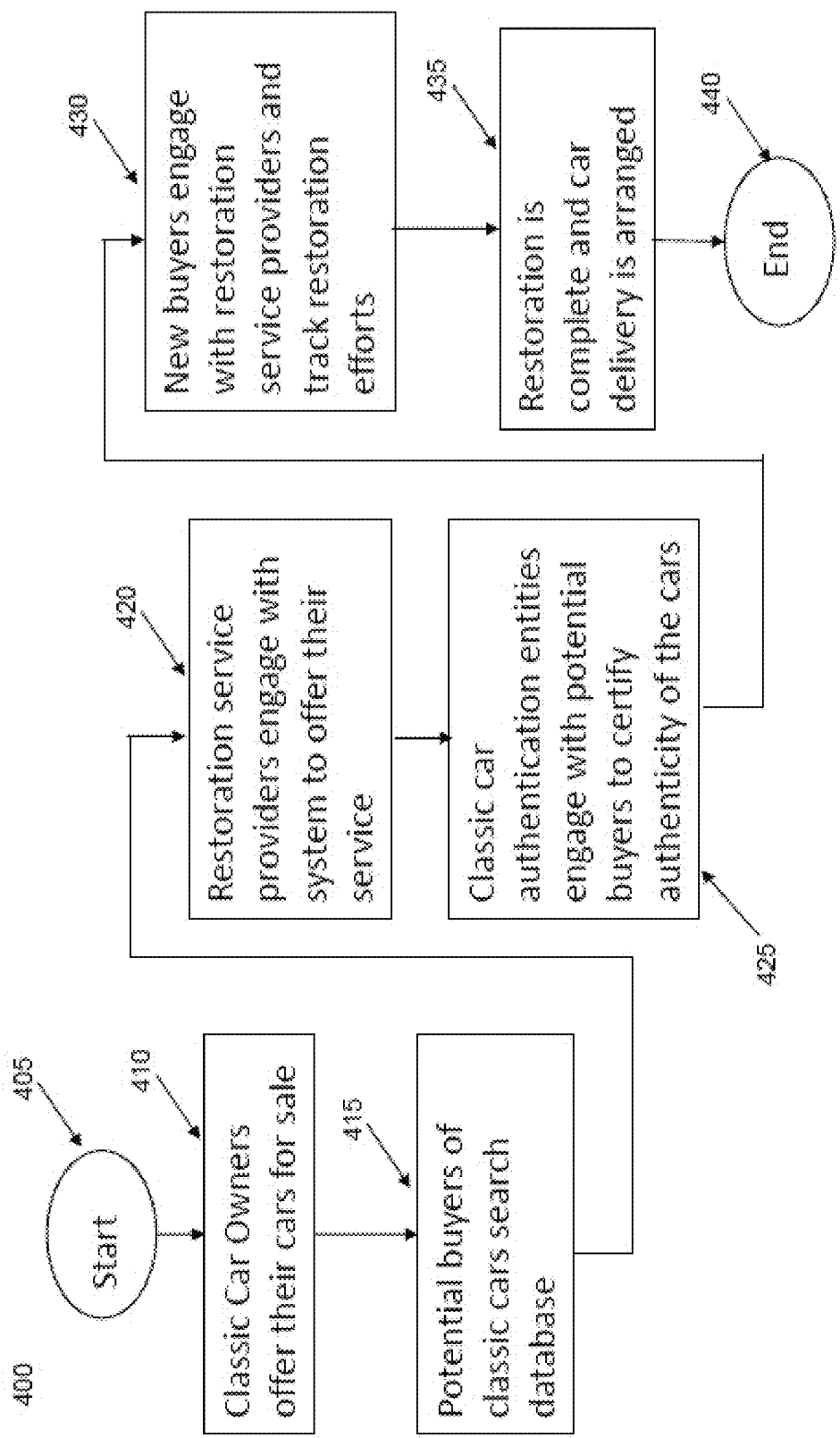
FIG. 4 is a flow chart of processes in an embodiment of the present invention.

As best seen in FIG. 4, processes in an embodiment of the present invention are shown. Utilizing an instant invention application 400, the process starts at step 405 and classic car owners can offer their cars for sale step 410. Potential buyers of classic cars can search databases step 415 for classic cars. Restoration service providers step 420 can engage with system to offer their services. Classic car authentication entities step 425 can engage with potential buyers to certify authenticity of classic cars. New buyers engage step 430 with restoration service providers and track restoration efforts. Restoration is complete and car delivery is arranged step 435. Furthermore, restoration service providers can engage with the system to offer their services.

Figure 5:
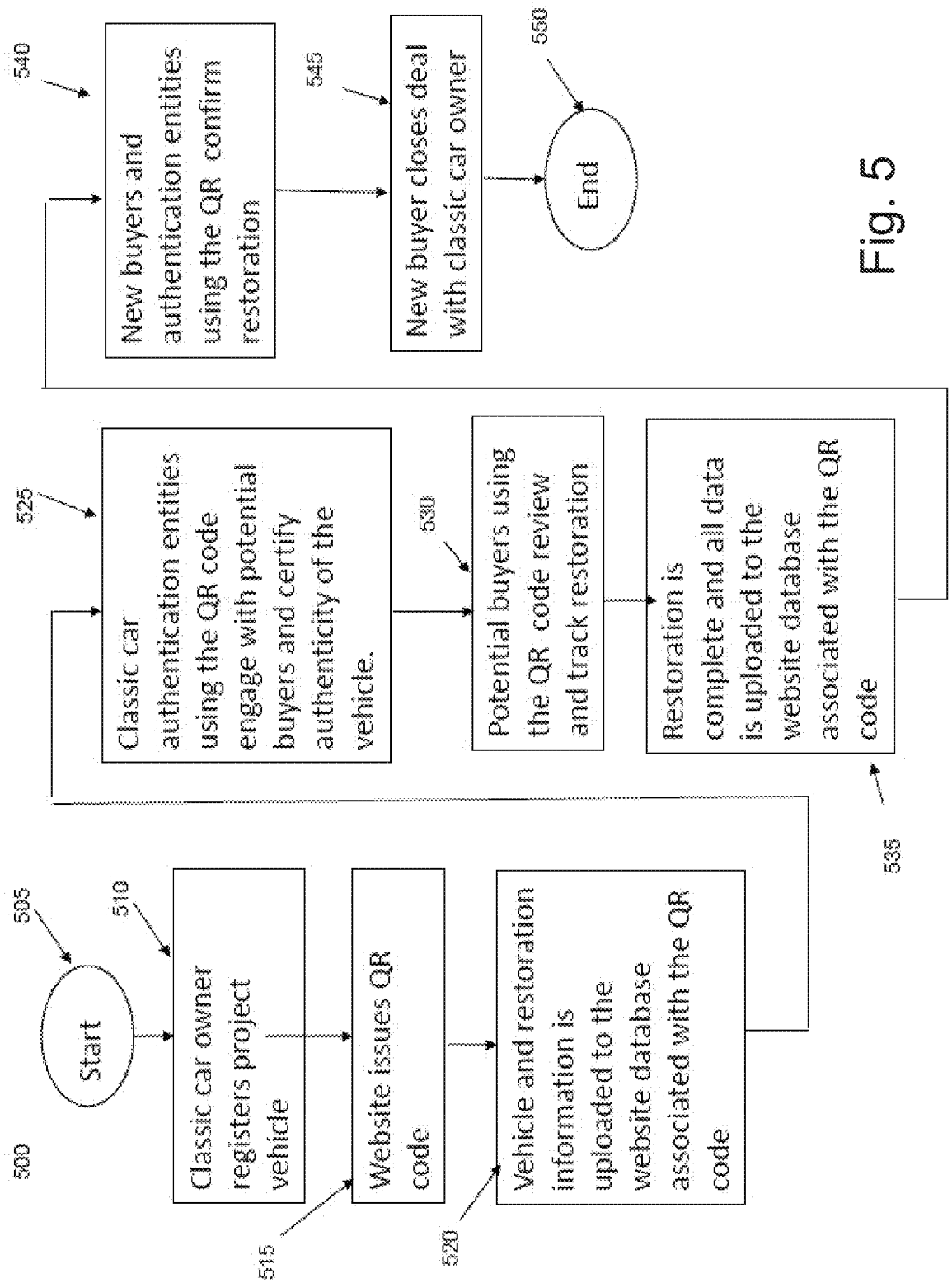
FIG. 5 is a flow chart of system using the QR code.

Referring to FIG. 5, the process 500 starts at step 505. The classic car owner registers project vehicle step 510 by inputting the restoration information such as Vehicle Identification Number (VIN), license plate number, owner and mechanic information, history information and digital documentation. The instant invention website issues the unique QR code for the vehicle project step 515. As the restoration progresses the vehicle and restoration information are uploaded to the website database associated with the QR code step 520. As the restoration progresses classic car authentication entities using the QR code engage with potential buyers and certify authenticity of the vehicle step 525. Potential buyers using the QR code review and track restoration of the vehicle step 530. When the restoration is complete and all data is uploaded to the website database associated with the QR code step 535. After the restoration is complete the new buyers and authentication entities using the QR confirm restoration step 540. New buyer closes deal with classic car owner step 545 and the process ends step 550. The end of the process can have multiple results. The project is not deleted from the instant invention database. The instant invention may charge a maintenance fee for keeping the information available online which can be paid depending on the available options either weekly, monthly or yearly.

Figure 6:
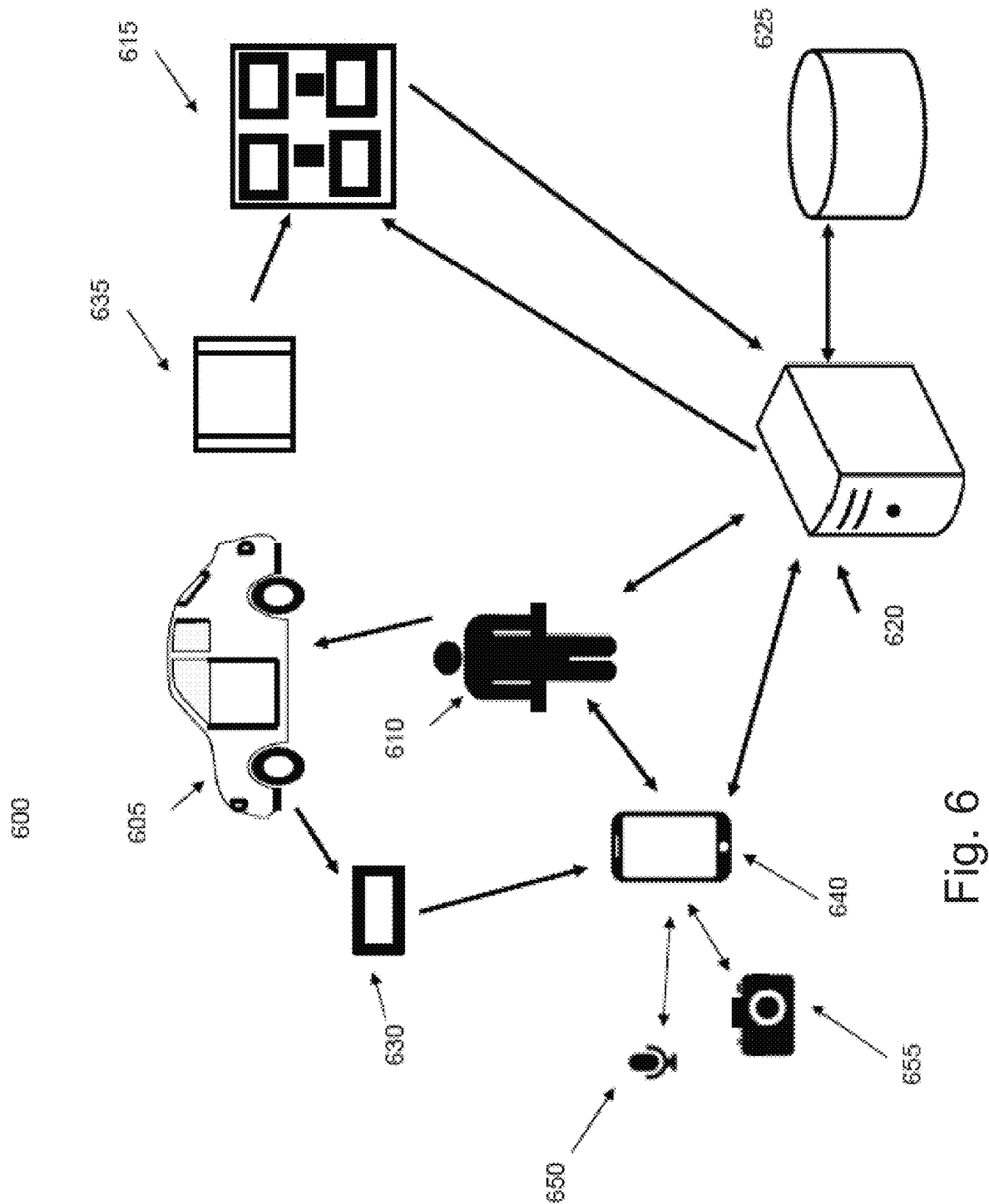
FIG. 6 shows the process where classic car owner having a classic car using the instant invention.

Referring to FIG. 6 process 600 where classic car owner 610 has classic car 605 using smart mobile device 640 having microphone 650 and camera 655 the classic car owner 610 registers the classic car 605 on the instant invention system residing on server 620 using the registration information comprising of owner information and classic car information. Server 620 issues QR code 615 and classic car owner 610 prints QR code 615 using smart mobile device 640 and printer 635. The instant invention system residing on server 620 stores the QR code 615 and the registration information in database 625. The classic car owner 610 takes photographs 630 of the classic car 605 using smart mobile device 640 and uploads photographs 630 registration information to server 620 and server 620 stores the photographs 630 in database 625.

Smart mobile device 640 and server 620 are preferably connected to the internet using a wireless connection such as wireless Wi-Fi protocol, IEEE 802.11 Wi-Fi protocols or mobile internet protocols such as 3G and 5G.

The smart mobile device 640 is preferably a cellular connected device such as a smart phone or tablet. However, since the information being transmitted and stored is sensitive to the final valuation of the restored classic car and the methods of restoration can be proprietary to the restoration professional, the instant invention provides authenticators and dealers with a specialized smart mobile device 640 that replaces the unsecure smart mobile device. The specialized smart mobile device 640 is configured with the application built into the specialized smart mobile device 640. The specialized smart mobile device 640 is comprised of a display, input device, a cellular networking capability which operates on a virtual private network (VPN), a video camera for capturing photographs and videos, a microphone for capturing audio data. By providing the specialized smart mobile device to authenticators and dealers it ensures the security of the data and makes the system more secure such that the instant invention can guarantee the data upload is authentic because each specialized smart mobile device 640 also has a unique identifier built into it and it is not able to run any other applications, therefore guaranteeing the accuracy of the data. The authenticators and dealers can purchase the specialized smart mobile device 640 from the website of the instant invention and it can only be used to upload and create data for transmitting to the instant invention because the authenticators and dealers are prevented from adding other applications to the specialized smart mobile device 640 and the unique identifier built into it is associated with the authenticators and dealers that purchase the specialized smart mobile device 640 which closes the security loop.

In some embodiments, the system, method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CDs, flash drives, cloud storage, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that a certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

The present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further, it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized the scope of this invention is much broader than presented by the claim. It is intended that broader claims will be submitted in an application that claims the benefit of priority from this application.

What is claimed is:

1. A method of tracking a renovation of a classic automobile comprising of:
    a first owner installing an application on a smart mobile device;
    said first owner using said smart mobile device and registering said classic automobile by entering registration information to a computer based system containing a database;
    said database issuing an inventory identifier identification device viewable using said application on said smart mobile device;
    said computer based system containing said database storing said registration information and said inventory identifier identification device to form a record identified by said inventory identifier identification device on said database;
    said first owner taking photographs using said smart mobile device and using said application on said smart mobile device uploading said photographs and said inventory identifier identification device to said computer based system containing said database;
    said computer based system containing said database storing said photographs in said record on said database identified by said inventory identifier identification device;
    a restoration authenticator using said inventory identifier identification device and a second smart mobile device with a second application on said second smart mobile device and downloading said registration information and said photographs to said second smart mobile device;
    a buyer using said inventory identifier identification device and a third smart mobile device with a third application on said third smart mobile device and downloading said registration information and said photographs to said third smart mobile device;
    said restoration authenticator providing a value for said classic automobile using said second smart mobile device with a second application on said second smart mobile device to said buyer using said third smart mobile device with a third application on said third smart mobile device; and
    said buyer purchasing said classic automobile from said first owner.

2. The method of tracking a renovation of a classic automobile of claim 1 having said inventory identifier identification device wherein said inventory identifier identification device is selected from the group consisting of QR code, Bluetooth tag, Zigbee tag and RFID tag.

3. The method of tracking a renovation of a classic automobile of claim 1 having said registration information wherein said registration information comprises of Vehicle Identification Number (VIN), license plate number, owner and mechanic information and automobile history information.

4. The method of tracking a renovation of a classic automobile of claim 1 having said photographs wherein said photographs are selected from the group consisting of photographs of automobile, receipts, invoices and documentation.

5. A method of tracking a renovation of a classic automobile comprising of:
    a first owner buying a first smart mobile device;
    said first smart mobile device having an application which is in communication with a camera and a microphone and said first smart mobile device having an application wirelessly in communication with a communication network;
    said first owner registering said classic automobile by entering registration information using said first smart mobile device having an application wirelessly in communication with a communication network to a computer based system containing a database device wirelessly in communication with said communication network;
    said database device issuing an inventory identifier identification device viewable using said application on a smart mobile device;
    said computer based system containing said database device storing said registration information and said inventory identifier identification device to form a record identified by said owner and said classic automobile on said database device;
    said first owner taking photographs using said first smart mobile device having an application wirelessly in communication with a communication network and uploading said photographs to said computer based system containing said database device and storing said photographs in said record identified by said owner and said classic automobile on said database device;
    a restoration authenticator using said inventory identifier identification device and a second smart mobile device wirelessly in communication with a communication network with a second application on said second smart mobile device and downloading said registration information and said photographs to said second smart mobile device;
    a buyer using said inventory identifier identification device and a third smart mobile device wirelessly in communication with a communication network with a third application on said third smart mobile device and downloading said registration information and said photographs to said third smart mobile device;
    said restoration authenticator providing a value for said classic automobile using said second smart mobile device with a second application on said second smart mobile device to said buyer using said third smart mobile device with a third application on said third smart mobile device; and
    said buyer purchasing said classic automobile from said first owner.

6. The method of tracking a renovation of a classic automobile of claim 5 having said inventory identifier identification device wherein said inventory identifier identification device is selected from the group consisting of QR code, Bluetooth tag, Zigbee tag and RFID tag.

7. The method of tracking a renovation of a classic automobile of claim 5 having said registration information wherein said registration information comprises of Vehicle Identification Number (VIN), license plate number, owner and mechanic information and automobile history information.

8. The method of tracking a renovation of a classic automobile of claim 5 having said photographs wherein said photographs are selected from the group consisting of photographs of automobile, receipts, invoices and documentation.

9. A method of tracking a renovation of a classic automobile comprising of:
- a first owner installing an application on a smart mobile device wirelessly in communication with a communication network; said first owner using said smart mobile device and registering said classic automobile by entering registration information to a computer based system containing a database device wirelessly in communication with a communication network;
- said database device issuing an inventory identifier identification device viewable using said application on a smart mobile device;
- said computer based system containing said database device storing said registration information and said inventory identifier identification device to form a record identified by said inventory identifier identification device on said database device;
- said first owner taking photographs using said smart mobile device and using said application on said smart mobile device uploading said photographs and said inventory identifier identification device to said computer based system containing said database;
- said computer based system containing said database device storing said photographs in said record identified by said inventory identifier identification device;
- said first owner printing said inventory identifier identification device;
- a buyer using said inventory identifier identification device and a second smart mobile device wirelessly in communication with a communication network with a second application on said second smart mobile device and scanning said printed inventory identifier identification device with said second smart mobile device and using said scanned printed inventory identifier identification device and said second application on said second smart mobile device downloading said registration information and said photographs to said second smart mobile device; and
- said buyer purchasing said classic automobile from said first owner.

10. The method of tracking a renovation of a classic automobile of claim 9 having said inventory identifier identification device wherein said inventory identifier identification device is selected from the group consisting of QR code, Bluetooth tag, Zigbee tag and RFID tag.

11. The method of tracking a renovation of a classic automobile of claim 9 having said registration information wherein said registration information comprises of Vehicle Identification Number (VIN), license plate number, owner and mechanic information and automobile history information.

12. The method of tracking a renovation of a classic automobile of claim 9 having said photographs wherein said photographs are selected from the group consisting of photographs of automobile, receipts, invoices and documentation.

* * * * *